Sept. 16, 1941.  C. ADAMSON  2,255,907
CONVEYER
Filed May 15, 1940
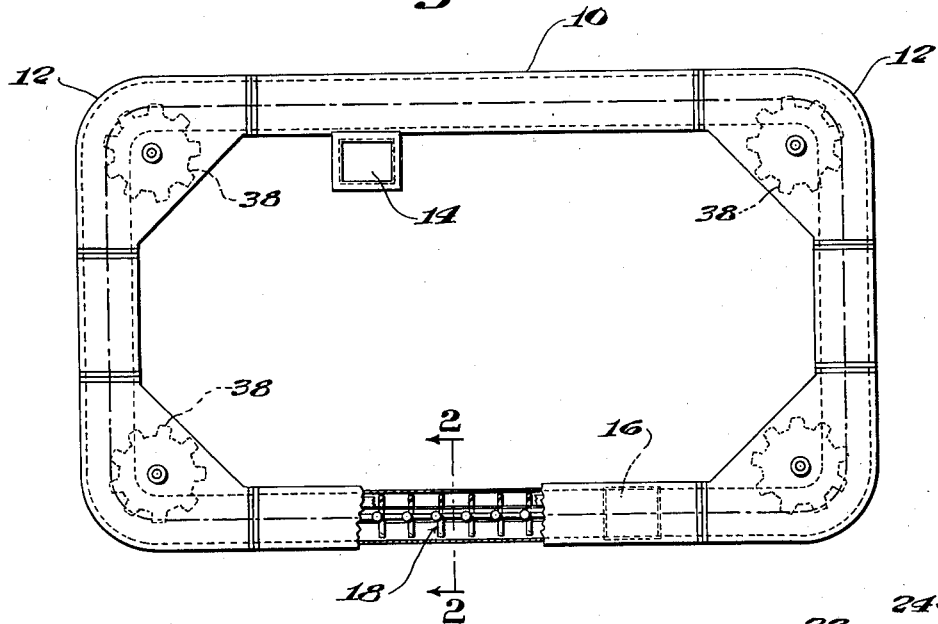
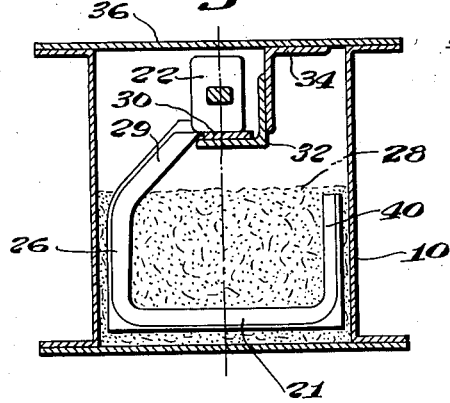
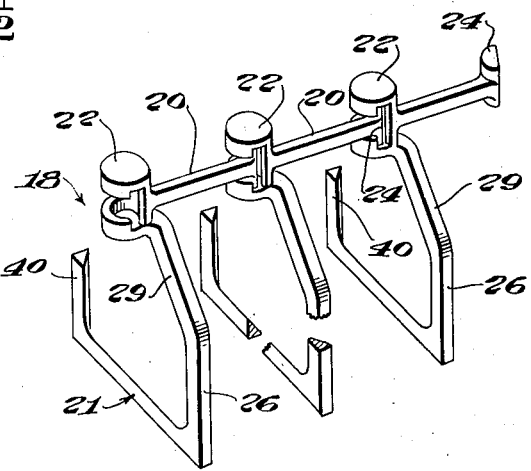
INVENTOR
Clarence Adamson
BY J. Stanley Churchill
ATTORNEY Patented Sept. 16, 1941

2,255,907

UNITED STATES PATENT OFFICE 2,255,907

CONVEYER

Clarence Adamson, Aurora, Ill., assignor to Redler Conveyor Company, Quincy, Mass., a corporation of Massachusetts Application May 15, 1940, Serial No. 335,274

8 Claims. (Cl. 198—174)

This invention relates to a conveyer and to a conveying element therefor.

The invention has for one of its objects to provide a novel and improved conveyer of the horizontal type particularly adapted for the conveyance of flowable solid material in which provision is made for supporting the conveying element with relation to the casing through which it is drawn in a manner such as to enable the conveyer to perform the conveying operation with maximum efficiency.

A further object of the invention is to provide a novel and improved conveying element of a construction such as to enable the same to be drawn through the casing in a manner such as to substantially equalize the strain upon the flights and connections and to reduce to a minimum any twisting or cramping action of the parts when conveying a load of material through the casing.

With these general objects in view and such others as may hereinafter appear, the invention consists in the conveyer and in the conveying element hereinafter described and particularly defined in the claims at the end of this specification.

In the drawing illustrating the preferred embodiment of the invention, Fig. 1 is a plan view of a conveyer embodying the present invention; Fig. 2 is a cross-section on the line 2—2 of Fig. 1; and Fig. 3 is a perspective detail view of a portion of the present conveying element.

In general, the present conveyer contemplates an improvement in the conveyer illustrated and described in the United States patent to Sinden, No. 2,155,874, April 29, 1939, which comprises a conveyer particularly adapted for conveying material in a general horizontal direction, and as illustrated in said patent includes a casing or trough and a conveying element made up of a plurality of detachably connected links having integral U-shaped flights. The conveying element is arranged to be driven by sprockets arranged to engage hub portions disposed at the top of one of the arms of each of the U-shaped flights.

Prior to the present invention, the conveying element was constructed with the hub portions of the tension links disposed substantially in alignment with one of the legs of the U-shaped flight. In practice, use of this construction of conveyer exerted a cramping action upon the connecting links when the conveyer was operating under a load, and subjected the different parts of the flights to unequal strain, and this tended to twist the tension links out of alignment, thus interfering with the most efficient operation of the conveyer.

In accordance with the present invention, the hub portions of the tension element formed by the connected tension links are disposed centrally of the trough thereby equalizing the strain upon the flights during the operation of the conveyer, whereby the cramping and twisting action heretofore experienced, is reduced to a minimum.

Referring now to the drawing, in the preferred and illustrated embodiment of the invention, the conveyer comprises a horizontally disposed casing or trough 10, herein shown as extending in a general rectangular path and with the corner portions 12 curved as illustrated. The casing may and preferably will be provided with the usual inlet 14 and outlet 16, as illustrated. The conveyer is further provided with a conveying element 18 preferably of open structure disposed therein and capable of being moved therethrough to effect the conveyance of flowable solid material through the trough. The conveying element 18, as herein illustrated, is made up of a plurality of connected links 20 comprising the tension element, each link 20 being provided with a U-shaped flight member 21 formed integrally therewith. Each tension link 20 is provided at one end with a slotted hub 22 of general cylindrical shape and at the other end with a lug or boss 24 which is adapted to be received within the hollow hub 22 of the next succeeding link of the tension element.

As illustrated in Figs. 2 and 3, one leg 26 of each U-shaped flight member is made longer than the other extending above the level of the material 28 in the trough 10, and having its upper portion 29 extended inwardly at an angle and connected to the hub portion 22 of the tension link 20. As herein shown, the hub portion 22 of each tension element is disposed centrally of the trough.

Provision is made for supporting the conveying element as it is being drawn through the trough and as herein shown, the bottom of each hub portion 22 is arranged to slide along an elongated rail 30 supported in a guide comprising angle members 32, 34 depending from the underside of the cover member 36 of the conveyer casing.

In the illustrated embodiment of the invention, in order to drive the conveyer, the conveying element is arranged to pass around sprockets 38, at least one of which may be driven from any suitable source of power such as an electric motor, not shown. During the operation of the conveyer, material is supplied to the interior of the casing through the inlet 14 and as the conveying element is drawn through the casing, the material is leveled off so that the conveyer casing is filled with the material being conveyed to the level of the upper end of the second leg 40 of the U-shaped flights and this level is disposed beneath the level of the slotted hub portions 22 of the conveying element.

From the above description, it will be observed that the present construction of conveying element is adapted to equalize the strain upon the operating parts as the conveying element is drawn through the casing, so as to enable the conveyer to perform its operations with maixmum efficiency.

While the preferred embodiment of the invention has been herein illustrated and described, it will be understood that the invention may be embodied in other forms within the scope of the following claims.

Having thus described the invention, what is claimed is:

1. For use in a conveyer for conveying flowable solid material, having a casing, a conveying element traversable therethrough, said conveying element comprising a plurality of connected units each comprising an open flight member extended transversely of the casing and a tension link disposed above and substantially centrally of the flight member.

2. For use in a conveyer for conveying flowable solid material, having a casing, a conveying element traversable therethrough, said conveying element comprising a plurality of connected units each comprising a plurality of spaced flights each extending transversely of the casing and flight connecting means disposed above and substantially centrally of the flights.

3. For use in a conveyer for conveying flowable solid material, having a casing, a conveying element traversable therethrough, said conveying element comprising a plurality of connected units each comprising a plurality of spaced open flights each extending transversely of the casing and flight connecting means disposed above and substantially centrally of the flights.

4. For use in a conveyer for conveying flowable solid material, having a casing, a conveying element traversable therethrough, said conveying element comprising a plurality of connected units each comprising an open flight member extended transversely of the casing and a tension link disposed above and substantially centrally of the flight member, and a track mounted upon the upper wall of the casing along which said flight connecting means is arranged to travel.

5. For use in a conveyer for conveying flowable solid material, having a casing, a conveying element traversable therethrough, said conveying element comprising a plurality of connected units each comprising an open U-shaped flight member extended transversely of the casing and a tension link disposed above and substantially centrally of the flight member and connected to one leg thereof.

6. For use in a conveyer for conveying flowable solid material, having a casing, a conveying element traversable therethrough, said conveying element comprising a plurality of connected units each comprising an open U-shaped flight member extended transversely of the casing, and a tension link comprising a longitudinally extended member disposed substantially centrally of the flight and connected to one leg of said U-shaped flight member a substantial distance above the normal level of the material being conveyed.

7. For use in conveyer for conveying flowable solid material, having a casing, a conveying element traversable therethrough, said conveying element comprising a plurality of connected units each comprising an open flight member extended transversely of the casing and an integral tension link disposed above and substantially centrally of said flight member, and a support carried by the casing for said conveying element along which said tension links are arranged to slide.

8. For use in a conveyer for conveying flowable solid material, having a casing, a conveying element traversable therethrough, said conveying element comprising a plurality of connected units each comprising an open U-shaped flight member extended transversely of the casing and a tension link disposed above and substantially centrally of said flight member and connected to one leg thereof, and means for maintaining said conveying element in predetermined vertical relation to the casing comprising an elongated track disposed centrally of the casing and a substantial distance above the normal level of the material being conveyed.

CLARENCE ADAMSON.